Feb. 16, 1954     J. BAILEY ET AL     2,668,988
METHOD FOR INCREASING THE TEAR RESISTANCE OF PLASTIC FILM
Filed June 3, 1950
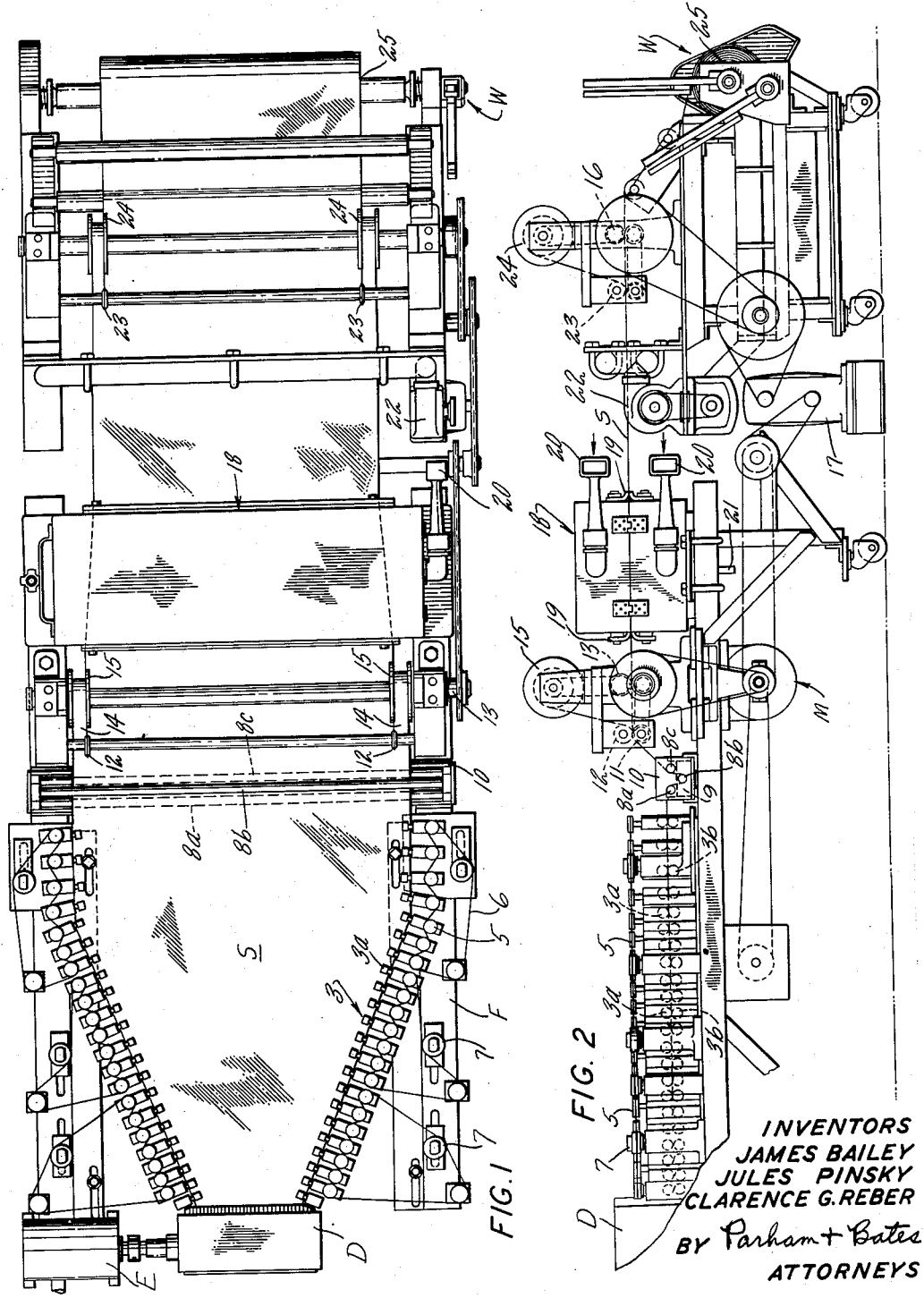
INVENTORS
JAMES BAILEY
JULES PINSKY
CLARENCE G. REBER
BY Parham + Bates
ATTORNEYS Patented Feb. 16, 1954

2,668,988

UNITED STATES PATENT OFFICE 2,668,988

METHOD FOR INCREASING THE TEAR RESISTANCE OF PLASTIC FILM

James Bailey and Jules Pinsky, West Hartford, and Clarence G. Reber, Newington, Conn., assignors to Plax Corporation, West Hartford, Conn., a corporation of Delaware Application June 3, 1950, Serial No. 166,014

5 Claims. (Cl. 18—47.5)

The invention relates to the production of continuous organic plastic film by extrusion and has for a general object the provision of a novel process for producing such film.

Various organic plastic compounds may be formed into sheet and tubing in accordance with the invention. An example of the type of plastic compounds with which the invention is concerned is polyethylene.

The invention has been developed primarily for use in "dry process" extrusion. The term "dry process" means that the plastic compounds which are extruded are substantially "solvent-free" or free of solvents.

U. S. Patent 2,297,645, which issued September 29, 1942, to the assignee of the present invention, discloses process and apparatus for the "dry process" extrusion of organic plastic sheet. The present invention is an improvement in the practice disclosed in that patent in that it provided film having a substantially higher tear or shear strength.

Accordingly, it is a principal object of the invention to provide a process in which film is stretched and its temperature controlled in a manner such that the final product has a high tear strength.

Film having high tear strength is obtained in accordance with the present invention by means of process and apparatus in which the temperature and stretching of the extruded film is controlled and coordinated in a novel manner, which is hereinafter described with reference to a preferred embodiment illustrated in the accompanying drawings in which:

Figure 1 is a top plan view of apparatus for forming continuous plastic film having high tear strength; and Fig. 2 is a side elevational view of the apparatus shown in Fig. 1.

Referring more particularly to the drawing, there is shown an outlet end 1 of a stuffer or extruder, generally designated E, for supplying a thermoplastic organic compound, such as polyethylene, in a heated, plastic condition to an extrusion nozzle or die D from which the plastic issues under pressure as an extruded film or sheet generally designated S.

It will be understood that the extruder E serves to compress and work the organic plastic material and to heat and soften it to a condition suitable for extrusion. The extruder E preferably will include a suitable homogenizer (not shown) which assures that the plastic supplied to the die D is in a completely homogeneous condition.

As the plastic sheet issues from the die D, it is gripped along narrow edge portions by successive pairs of roller-gripper units 3 at both sides of the sheet. One or more of the numerous pairs of rolls 3 at both sides of the sheet serve to cool and substantially stiffen the side edges of the sheet gripped thereby while, at the same time, drawing the sheets S from the nozzle D and stretching it transversely.

The several roller-gripper units 3 may be adjustably mounted on a grill F so that their positions may be changed to vary the amount and rate of stretch applied to the sheet S and thereby control the width of the stretched sheet.

Each of the illustrated roller-gripper units 3 includes a pair of rolls 3a, 3b, at least one of which is positively driven as by means of suitable bevel gears (not shown) and pulley 5. The drive pulleys 5 of the several gripper units 3 are driven by belt or chain drives 6 and suitable intermediate idler pulleys 7.

In the illustrated embodiment, the gripper units 3 are arranged on both sides of the sheet along diverging lines in such a way as to transversely stretch the sheet along diverging lines and stretch the sheet approximately three times its extrusion or nozzle width. From the last of the gripper units, the transversely stretched sheet S may be fed by transverse festooning rolls 8a, 8b, 8c through a water-quenching bath 9 in a tank 10. However, alternative means may be employed to cool and establish the laterally stretched sheet at a non-plastic shape-maintaining temperature.

In accordance with the invention, the sheet is drawn in a non-tacky and substantially shape-maintaining condition from the quenching bath or other suitable cooling zone through a trimmer roll 11 and spaced trimmer blades 12 by a pair of driven pinch rolls 13 which act to maintain necessary pulling tension on the entire width of the sheet back through the festooning rolls of the quenching bath 9 and on the suspended portion of the sheet S intermediate the transverse stretching units 3. The spaced trimmer blades 12 at each side of the sheet cut off the heavy edge strips 14 of the sheet which may be wound on a trim winder 15.

From the first set of pinch rolls 13 the sheet S is drawn through a second set of pinch rolls 16 at an increased linear speed so that the sheet is longitudinally stretched therebetween.

In the embodiment illustrated, the first set of pinch rolls 13 is driven directly by a motor drive M, which is common to the transverse stretching rolls 3, and the second set of pinch rolls 16 is connected with the drive M through a P. I. V. variable speed regulator 17 so that the proper amount of longitudinal stretch can be effected between the rolls 13 and 16.

Between the pinch rolls 13 and 16 there is installed a steam box, generally designated 18, through which the sheet passes and by means of which its temperature is raised to that necessary to effect the proper longitudinal stretching.

As shown in Fig. 2, the steam box 18 is a closed compartment through which the sheet S is drawn. Openings through which the sheet enters and leaves the box 18 may be provided with flexible flaps 19 to reduce the loss of steam from within the box. Steam is supplied to the box through supply pipes 20 and condensate is exhausted through a drain pipe 21. An air blower unit 22 is provided between the steam box 18 and the pinch rolls 16 to remove moisture from the film and to reduce the temperature of the sheet to a set or shape-maintaining condition before it reaches the rolls 16.

As shown in the drawing, a set of edge trimming rolls 23 and a trim winder 24 also are provided for trimming the longitudinally stretched sheet to a desired finished width.

The trimmed sheet is fed from the pinch rolls 16 to a winder, generally designated W, where it is collected on a roll 25.

In employing the apparatus heretofore described to manufacture a sheet S having a high tear strength of polyethylene or similar thermoplastic materials, the extruder E may be operated at any desired temperature and pressure suitable for the thermoplastic material. In the case of polyethylene, the sheet S preferably issues from the die D at a temperature above 205° F. and remains above that temperature during all of the stretching prior to entering the chilling bath 9. To that end, the extrusion temperature may be sufficiently high (for example 350°) so that the sheet does not cool to 205° F. before leaving the last of the rolls 3 or, if necessary, additional heat may be supplied to maintain the sheet above 205° F.

In practicing the invention, it has been found desirable to cool the sheet S in the quenching bath 9 from a temperature above 205° F. to a temperature below 150° F.

In order to produce sheet having high tear strength, the sheet must be stretched 50% or more at a temperature of approximately 205° F. or below and the stretching must be effected substantially uniformly over a wide area rather than by an abrupt necking-down along a line or narrow band. Stretching effected at temperature above 205° F. has little, if any, apparent effect on tear strength. Apparently the stretching must be effected with substantial force in order to improve the tear strength and, at temperature above 205° F., the elastic limit for polyethylene is too low to sustain the necessary force.

However, it also has been found that polyethylene and similar materials neck-down rather than stretch uniformly when too great a stretching force is applied, and therefore it is apparent that there is a lower as well as an upper limit for the range of force which is suitable for effecting stretching uniformly over an area and in an amount sufficient to improve the tear strength.

In accordance with the present invention, the necessary stretching force or stress is assured by maintaining the sheet passing through the steam box 18 at a temperature which is not greater than approximately 205° F. and which is not less than the lowest temperature at which the sheet S within the box 18 stretches substantially uniformly over its entire area under a pulling force which produces approximately a 50% stretch.

In practice, 150° F. generally will be found to be the lower limit of the permissive temperature range despite the fact that sheet traveling at a slow rate through the steam box 18 may be uniformly stretched the necessary 50% or more at lower temperatures. However, at acceptable commercial production rates, the maximum permissive stress which produces uniform rather than non-uniform stretching ordinarily will not produce the required 50% stretch at temperatures below 150° F. An excessive stretching stress must be applied at the lower temperatures to produce the necessary 50% stretch and "necking" or localized stretching is produced which weakens the lateral tear strength of the sheet.

A 70% elongation is preferable when the sheet stretching is effected between the pinch rolls 13 and 16 at or near 205° F. to compensate for any annealing out of stresses in the sheet and to assure a minimum 50% stretch or elastic memory being captured in the sheet S at or below the critical temperature.

The improvement in tear strength effected in sheet by means of the present invention is apparent from a comparison with sheet made in accordance with the practice disclosed in the aforementioned Patent 2,297,645. As an example, 4 mil polyethylene sheet produced in accordance with the present invention has an average tear strength of the order of 180 grams per mil when measured by the Elmendorf test method with the test load applied lengthwise of the sheet, and 220 grams per mil with the test load applied transversely of the sheet.

It also has been found that uniform or non-necking stretch in excess of 50% elongation and up to 100%, which is effected at temperature under 205° F., produce progressively higher tear strength measured by the Elmendorf test.

By contrast, sheet produced in accordance with Patent No. 2,297,645 and without the 50% uniform stretch at temperatures below 205° F. has an everage tear strength, measured by the same method, of roughly 70-90 grams per mil longitudinally and 115-130 laterally or transversely. Longitudinal tear strength falls off rapidly as stretch exceeds 100%.

As has previously been pointed out, the sheet S preferably is not stretched at temperature below 205° F. before reaching the first set of pinch rolls 13. If, however, some lateral stretch is introduced at temperatures below 205° F., a like longitudinal stretch should be effected between the pinch rolls 13 and 16 to compensate for that lateral stretch in addition to the 50 to 100% stretch introduced to obtain high tear strength.

A similar result can be obtained if at least 50% transverse stretching is effected by the gripper rolls 3 while the sheet is below 250° F. Sheet laterally stretched in this manner also has a tear strength in excess of 150 grams per mil in both the longitudinal transverse directions. However, positive grippers should be used in place of the roller grippers 3 shown in the drawing as the latter do not grip sufficiently tightly to pull the sheet with the force necessary to stretch it 50% at temperatures below 205° F.

The specific temperatures and temperature ranges heretofore identified are for the polyethylene which is presently available commercially and which has an average molecular weight of the order of 18,000. For polyethylene having higher average molecular weights, the critical upper temperature is slightly higher than the 205° F. upper temperature limit for the 18,000 molecular weight material. Similarly, the specific limits vary somewhat for copolymers of polyethylene and other polymers to which the present invention relates. However, in each instance, the upper limit is that above which stretching does not effect substantial improvement in tear strength, and the lower is that at which "necking down" rather than uniform stretching is effected under a load sufficient to produce at least 50% elongation.

We claim:

1. A process for improving polyethylene film which comprises heating and maintaining the film in a temperature range the upper limit of which is approximately 205° F. and the lower limit of which is approximately 150° F., substantially uniformly stretching the film in said range at least 50% and not more than approximately 100% and cooling said stretched sheet.

2. A process for improving polyethylene film which comprises heating the film to approximately 205° F., stretching said film while at said temperature approximately 50% and cooling the stretched film.

3. The process of manufacturing film from polyethylene which comprises continuously shaping said material by extrusion at a first location and at a first temperature above 205° F. to thereby continuously form the film, continuously conveying the shaped film to a second location removed from said first location, and substantially uniformly stretching said film approximately 50% at said second location and at a temperature of approximately 205° F.

4. The process of manufacturing film from polyethylene which comprises continuously extruding said material at a temperature above 205° F. in the form of film, and continuously stretching said film substantially uniformly at least 50% and in at more than approximately 100% at a temperature of approximately 205° F.

5. The process of manufacturing polyethylene film which comprises continuously extruding polyethylene at a temperature above approximately 205° F. as a film, continuously cooling said film to at least 205° F., maintaining the cooled film within a temperature range of approximately 150 to 205° F., and stretching the film within said temperature range in only one direction approximately 50%.

JAMES BAILEY.
JULES PINSKY.
CLARENCE G. REBER.

References Cited in the file of this patent

UNITED STATES PATENTS

| Number | Name | Date |
| --- | --- | --- |
| 2,219,700 | Perrin et al. | Oct. 29, 1940 |
| 2,321,635 | Taylor | June 15, 1943 |
| 2,429,177 | Young | Oct. 14, 1947 |
| 2,547,763 | Land et al. | Apr. 3, 1951 |

OTHER REFERENCES

Simonds, Handbook of Plastics, 2nd ed., January 1949, pgs. 573-576.